(12) United States Patent
Su et al.

(10) Patent No.: US 8,054,656 B2
(45) Date of Patent: Nov. 8, 2011

(54) SWITCHING CONTROL CIRCUIT FOR A SWITCHING POWER CONVERTER

(75) Inventors: Ying-Chieh Su, Sijhih (TW); Chih-Chi Chang, Taoyuan (TW)

(73) Assignee: System General Corp., Taipei Hsien (TW)

( * ) Notice: Subject to any disclaimer, the term of this patent is extended or adjusted under 35 U.S.C. 154(b) by 524 days.

(21) Appl. No.: 12/232,937

(22) Filed: Sep. 26, 2008

(65) Prior Publication Data

US 2009/0257251 A1 Oct. 15, 2009

Related U.S. Application Data

(60) Provisional application No. 61/123,789, filed on Apr. 11, 2008.

(51) Int. Cl.
*H02M 3/335* (2006.01)
(52) U.S. Cl. ...................... 363/21.15; 363/49
(58) Field of Classification Search .............. 363/49, 363/56.12, 21.12, 21.15, 21.18, 21.13, 21.01, 363/20, 97; 323/282–286, 272–274, 297; 315/291, 294, 297, 219
See application file for complete search history.

(56) References Cited

U.S. PATENT DOCUMENTS 7,054,170 B2 * 5/2006 Yang et al. ................ 363/21.18
* cited by examiner

*Primary Examiner* — Rajnikant Patel
(74) *Attorney, Agent, or Firm* — Rosenberg, Klein & Lee

(57) ABSTRACT

A switching control circuit is coupled to a switching device and an auxiliary winding of a transformer, wherein a primary winding of the transformer is coupled to the switching device. The switching control circuit includes a voltage receiver, a comparing unit and a propagation delay circuit, wherein the voltage receiver is coupled to the auxiliary winding of the transformer for receiving a reflected voltage signal and transforming the reflected voltage signal into a peak voltage signal, while the switching device is turned off. The comparing unit is coupled to the voltage receiver for receiving the peak voltage signal and a first threshold voltage, and outputting a comparison result. The propagation delay circuit is coupled to the comparing unit for receiving the comparison result, and outputting a PWM signal to turn on the switching device after a delay time.

18 Claims, 9 Drawing Sheets

US 8,054,656 B2

SWITCHING CONTROL CIRCUIT FOR A SWITCHING POWER CONVERTER

REFERENCE TO RELATED APPLICATIONS

This Patent Application is based on Provisional Patent Application Ser. No. 61/123,789, filed 11 Apr. 2008, currently pending.

BACKGROUND OF THE INVENTION

1. Field of the Invention

The present invention relates generally to a switching control circuit, and more specifically to a switching control circuit used for a switching power converter.

2. Description of Related Art

A power converter is used to convert an unregulated power source to a regulated voltage or current source. The power converter normally includes a transformer or a magnetic device having a primary winding and a secondary winding to provide isolation. A switching device connected in the primary winding to control energy transfer from the primary winding to the secondary winding. The power converter operates at a high frequency for allowing size and weight reduction.

However, the switching operation of the switching device will generate switching losses and electric-magnetic-interference (EMI). FIG. 1 shows a fly-back power converter and the waveforms are shown in FIG. 2. The switching device $Q_1$ is applied to switch a transformer $T_1$ and control the power delivered from the primary winding $N_P$ to the secondary winding $N_S$ of the transformer $T_1$. Energy is stored in the transformer $T_1$ when the switching device $Q_1$ is turned on. As the switching device $Q_1$ is switched off, the energy of the transformer $T_1$ is discharged to the output of the fly-back power converter through a rectifier $D_S$. In the meantime, a reflected voltage signal $V_R$ is generated in the primary winding $N_P$ of the transformer $T_1$ in accordance with the output voltage $V_O$ and the turn-ratio of the transformer $T_1$. Therefore, the voltage $V_D$ across the switching device $Q_1$ is equal to the input voltage $V_{IN}$ plus the reflected voltage signal $V_R$ once the switching device Q1 is turned off. The energy from the voltage $V_D$ is stored in the imaginary parasitic capacitor $C_Q$, corresponding to the parasitic capacitance of the switching device $Q_1$. After a discharge period $T_{DS}$, the energy of the transformer $T_1$ is fully discharged, the energy stored in the parasitic capacitor $C_Q$ flows back to the input voltage $V_{IN}$ through the primary winding $N_P$ of the transformer $T_1$. The parasitic capacitor $C_Q$ and the primary winding inductor (not shown) of the transformer $T_1$ develop a resonant tank, wherein its resonant frequency $f_R$ can be shown as equation (1), $$f_R = \frac{1}{2\pi\sqrt{L_p \times C_j}} \qquad (1)$$

Wherein, $C_j$ is the capacitance of the parasitic capacitor $C_Q$; $L_P$ is the inductance of the primary winding inductor of the transformer $T_1$.

During the resonant period, the energy of the parasitic capacitor $C_Q$ is delivered to the primary inductor of the transformer $T_1$ back and forth. There is a delay time $T_q$ corresponding to the time the parasitic capacitor $C_Q$ takes to discharge until the voltage $V_D$ reaches a minimum value. The delay time $T_q$ is the period of the quasi-resonance and it can be expressed as equation (2).

$$T_q = \frac{1}{4 \times f_R} \qquad (2)$$

Sum up, if the switching device $Q_1$ is turned on during the valley voltage across the switching device $Q_1$, which can achieve the soft switching so as to minimize the switching loss and EMI of the power converter.

SUMMARY OF THE INVENTION

The present invention proposes a switching control circuit used for a switching power converter. The switching control circuit is coupled to an auxiliary winding of a transformer for receiving a reflected voltage signal which is directly proportional to the voltage across a switching device, while the switching device is turned off. Moreover, the switching control circuit detects whether the voltage across the switching device is close to a valley voltage during the resonant period. Furthermore, the switching control circuit turns on the switching device while the voltage across the switching device is close to the valley voltage so as to achieve the object of soft switching and enhance the efficiency of the switching power converter.

The switching control circuit of the present invention is coupled to the switching device and the auxiliary winding of the transformer, wherein a primary winding of the transformer is coupled to the switching device. The switching control circuit includes a voltage receiver, a comparing unit and a propagation delay circuit, wherein the voltage receiver is coupled to the auxiliary winding of the transformer for receiving the reflected voltage signal and transforming the reflected voltage signal into a peak voltage signal, while the switching device is turned off. The comparing unit is coupled to the voltage receiver for receiving the peak voltage signal and a first threshold voltage, and outputting a comparison result. The propagation delay circuit is coupled to the comparing unit for receiving the comparison result, and outputting a PWM signal to turn on the switching device after a delay time.

The switching control circuit of the present invention further includes a minimum off-time circuit. The minimum off-time circuit is coupled to an output terminal of the switching power converter for generating an output signal in response to the magnitude of the load of the switching power converter. Moreover, the propagation delay circuit is coupled to the comparing unit and the minimum off-time circuit for receiving the comparison result and the output signal, and outputting the PWM signal to turn on the switching device after a delay time.

The switching control circuit of the present invention further includes a first delay circuit. The first delay circuit is coupled to the comparing unit and the minimum off-time circuit for outputting a first delay signal in response to the comparison result and the output signal. Moreover, the propagation delay circuit is coupled to the first delay circuit for receiving the first delay signal, and outputting the PWM signal to turn on the switching device after a delay time.

In summary, the switching control circuit of the present invention can detect whether the voltage across the switching device is close to the valley voltage in accordance with the reflected voltage signal, while the switching device is turned off. Moreover, the switching control circuit of the present invention further can adjust the off-time of the switching device according to the magnitude of the load of the switching power converter so as to achieve the effect of energy saving. Therefore, the switching control circuit of the present invention can provide soft switching and high efficiency for the switching power converter which is operating in various magnitudes of the load.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DETAILED DESCRIPTION OF PREFERRED EMBODIMENTS

Figure 1:
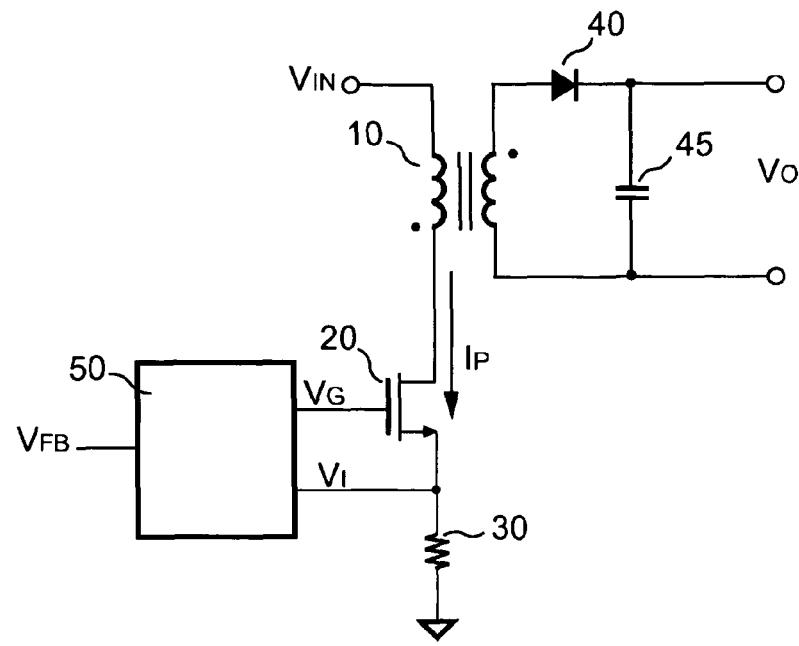
FIG. 1 is a circuit schematic diagram of a conventional fly-back power converter.
Figure 2:
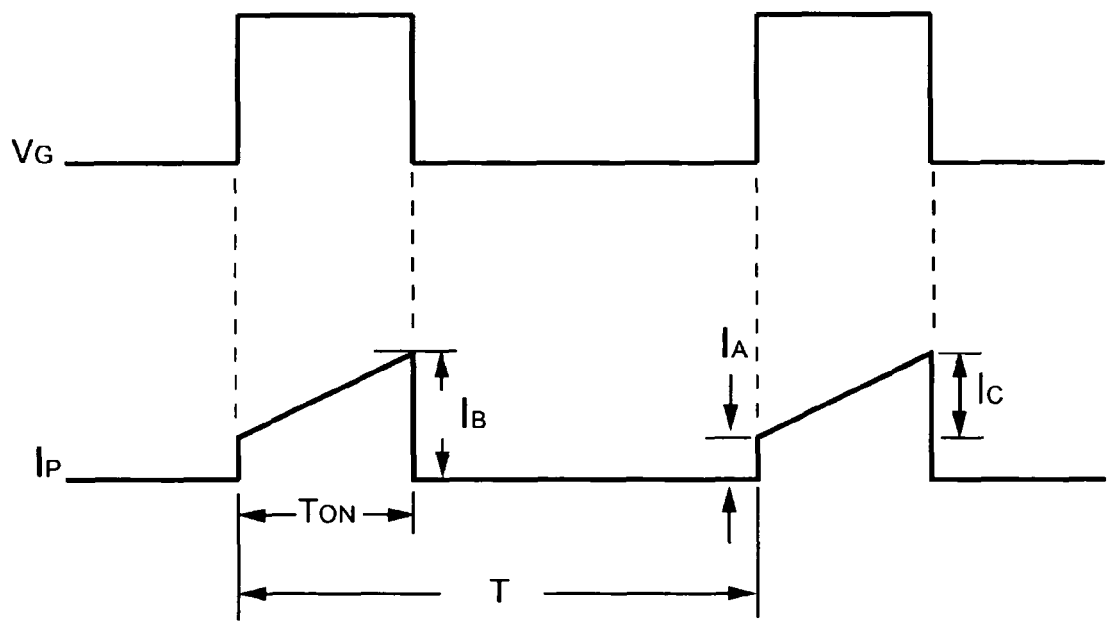
FIG. 2 is a wave schematic diagram of control signals of the conventional fly-back power converter.
Figure 3:
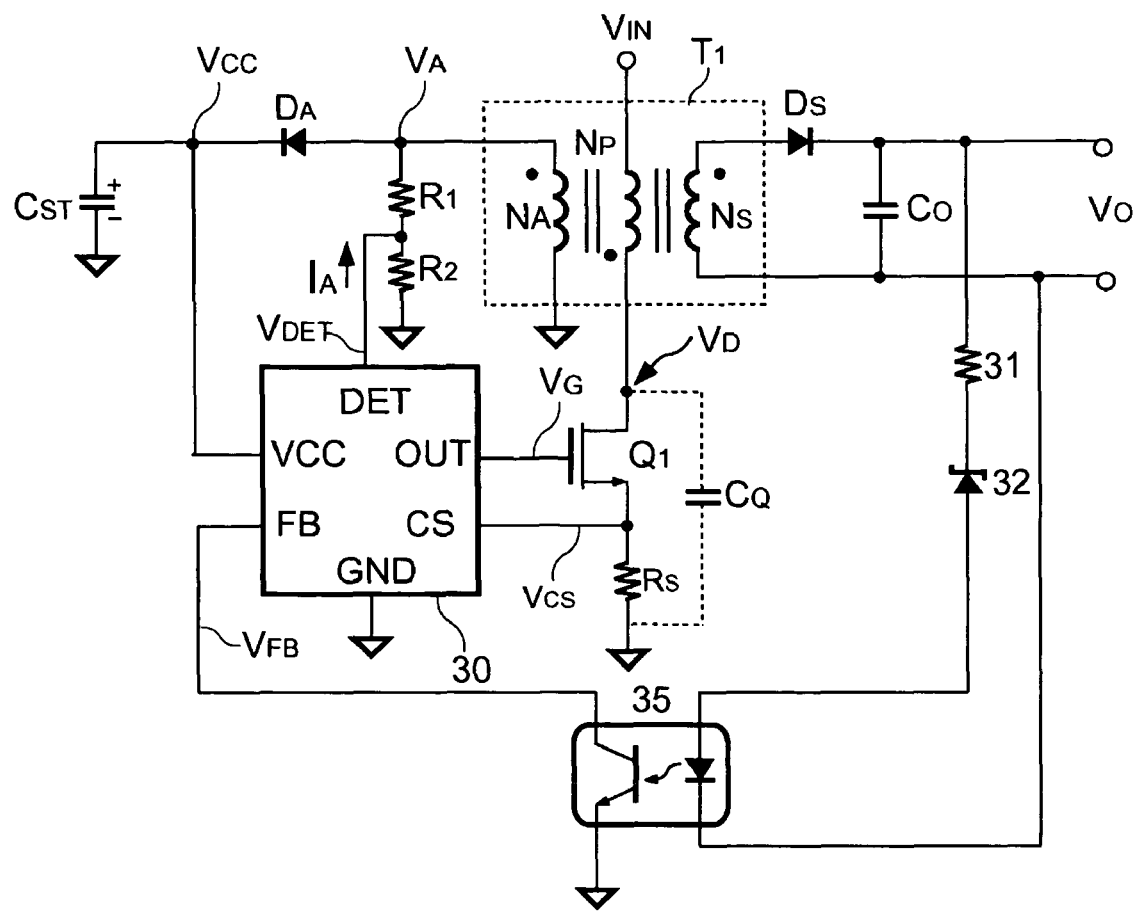
FIG. 3 is a preferred embodiment of a schematic diagram of a switching power converter of the present invention.

FIG. 3 is a preferred embodiment of a switching power converter, in which a switching control circuit 30 includes a feedback terminal FB, a current sense terminal CS, a voltage detecting terminal DET, an output terminal OUT, a power terminal VCC and a reference terminal GND. A transformer $T_1$ includes a primary winding $N_P$, a secondary winding $N_S$ and an auxiliary winding $N_A$, wherein the primary winding $N_P$ is coupled to a switching device $Q_1$, the secondary winding $N_S$ is coupled to an output terminal of the switching power converter through a first rectifier $D_S$ and a output capacitor $C_O$, and the auxiliary winding $N_A$ is coupled to the power terminal VCC of the switching control circuit 30 through a second rectifier $D_A$ and a capacitor $C_{ST}$ for supplying power $V_{CC}$ to the switching control circuit 30.

Reference is again made to FIG. 3. The voltage detecting terminal DET of the switching control circuit 30 is coupled to the auxiliary winding $N_A$ through resistors $R_1$, $R_2$, wherein the switching control circuit 30 receives a reflected voltage signal $V_{DET}$ from the resistor $R_2$, while the switching device $Q_1$ is turned off. The output terminal OUT of the switching control circuit 30 generates an output signal $V_G$ to drive the switching device $Q_1$, wherein a current sensing resistor $R_S$ is coupled to the switching device $Q_1$ for generating a switching current signal $V_{CS}$ while the switching device $Q_1$ is turned on. Moreover, current sensing terminal CS of the switching control circuit 30 is coupled to the current sensing resistor $R_S$ for receiving the switching current signal $V_{CS}$. Furthermore, the feedback terminal FB of the switching control circuit 30 is coupled to an optical coupler 35 for receiving a feedback signal $V_{FB}$, wherein the optical coupler 35 is coupled to the output terminal of the switching power converter through a resistor 31 and a voltage stabilizer 32 for receiving an output voltage $V_O$ and transforming the output voltage $V_O$ into the feedback signal $V_{FB}$.

Reference is again made to FIG. 3. The switching control circuit 30 receives the reflected voltage signal $V_{DET}$ from the auxiliary winding $N_A$ of the transformer $T_1$ through the resistors $R_1$, $R_2$, while the switching device $Q_1$ is turned off. Then, the switching control circuit 30 detects whether the voltage across the switching device $Q_1$ is close to a valley voltage during the resonant period, and turns on the switching device $Q_1$ while the voltage across the switching device is close to the valley voltage. As above, the switching control circuit 30 can achieve the object of soft switching for the switching power converter and enhance the efficiency of the switching power converter.

Additionally, the switching control circuit 30 further provides an over-power protection for the switching power converter according to the operational result of the feedback signal $V_{FB}$, the switching current signal $V_{CS}$ and the reflected voltage signal $V_{DET}$. Moreover, the switching control circuit 30 further provides an over-voltage protection for the switching power converter according to the operational result of the reflected voltage signal $V_{DET}$ and a threshold limit voltage (not shown).

Figure 4:
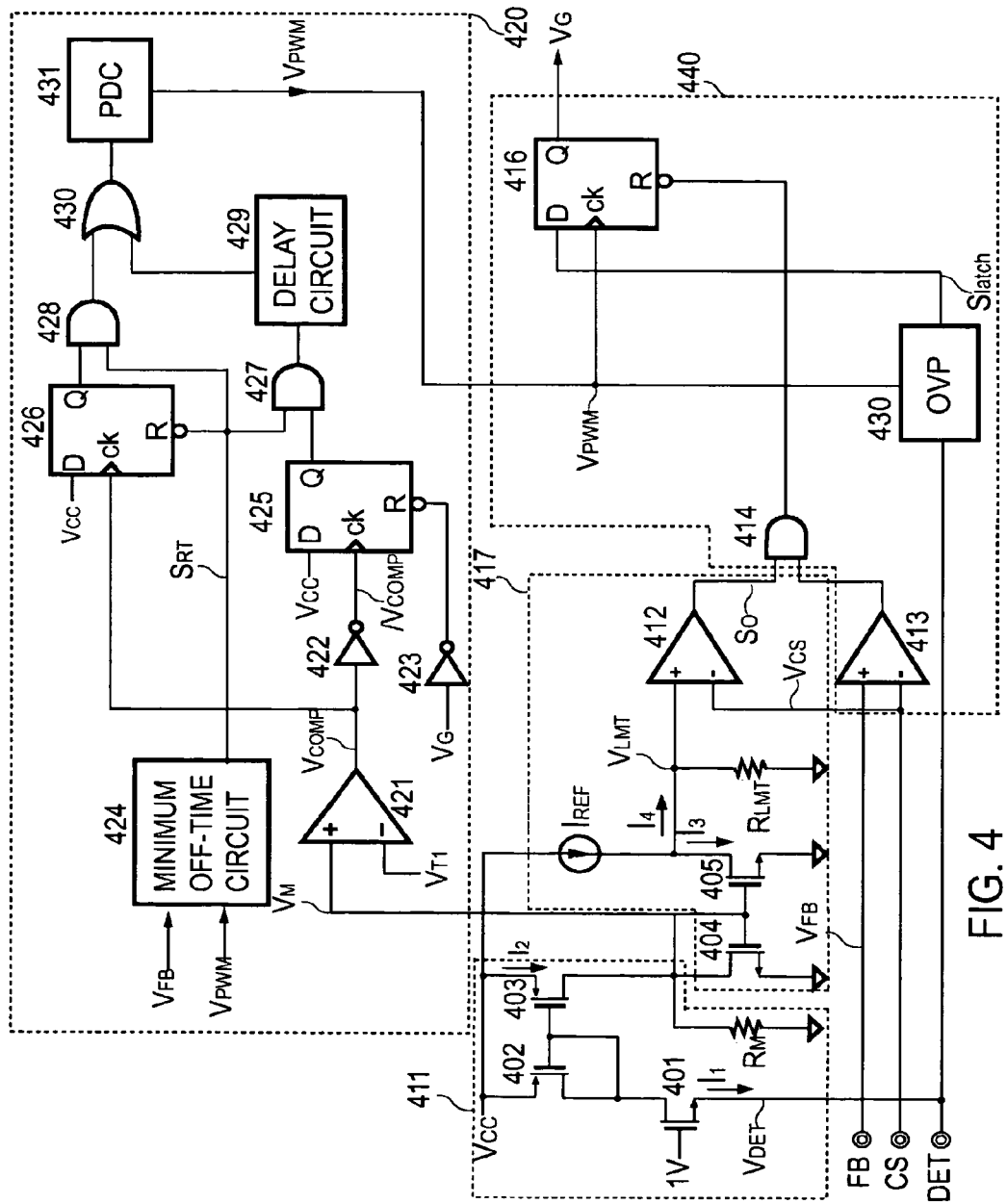
FIG. 4 is a schematic diagram of the switching control circuit of the present invention.

Referring to FIG. 4, which is a circuit diagram of a switch control circuit 30 according to an embodiment of the invention. The switching control circuit 30 comprises a voltage receiver 411 and an over-power protection circuit 417, a valley voltage detection circuit 420, and a limiting circuit 440.

The voltage receiver 411 includes a switch 401, a first current mirror which is composed of transistors 402, 403, and a sampling resistor $R_M$. The first current mirror is coupled to the auxiliary winding $N_A$ of the transformer $T_1$ through the switch 401 and the resistors $R_1$, $R_2$ (shown in FIG. 3). The switch 401 receives the reflected voltage signal $V_{DET}$ which is in proportional to the voltage $V_D$ across the switching device $Q_1$ from the resistor $R_2$ while the switching device $Q_1$ is turned off, wherein the reflected voltage signal $V_{DET}$ has alternate positive voltage and negative voltage during the resonant period.

When the reflected voltage signal $V_{DET}$ is in negative voltage, the switch 401 is turned on, and a first current $I_1$ flows through the switch 401. At this time, the first current mirror mirrors the first current $I_1$ into a second current $I_2$. Then, the sampling resistor $R_M$ coupled to the first current mirror receives the second current 12 and a peak voltage signal $V_M$ is generated, wherein the magnitude of the peak voltage signal $V_M$ is also proportional to the voltage $V_D$ across the switching device $Q_1$.

Reference is again made to FIG. 4 as well as FIG. 3. The valley voltage detection circuit 420 comprises a peak comparator 421, a first inverter 422, a second inverter 423, a minimum off-time circuit 424, a first D flip-flop circuit 425, a second flip-flop circuit 426, a first AND gate 427, a second AND gate 428, a delay circuit 429, an OR gate 430 and a propagation delay circuit (PDC) 431. The peak comparator 421 is coupled to receive the peak voltage signal $V_M$ for generating a control signal $V_{COMP}$ (comparison result) in response to the peak voltage signal $V_M$ and a threshold voltage $V_{T1}$. The first D flip-flop circuit 425 is coupled to receive the control signal $V_{COMP}$ through the first inverter 422. The first D flip-flop circuit 425 also has a reset terminal R couple to receive a switching signal $V_G$ through the second inverter 423. The delay circuit 429 is coupled to the output terminal Q of the first D flip-flop circuit 425 through the AND gate 427. Another terminal of the AND gate 427 is coupled to an output of the minimum off-time circuit 424. The minimum off-time circuit 424 generates a output signal $S_{RT}$ in response a feedback signal $V_{FB}$ and a PWM signal $V_{PWM}$. The second D flip-flop circuit 426 is coupled to receive the control signal $V_{COMP}$ and the output signal $S_{RT}$ for generating a first signal (not shown), The propagation delay circuit 431 is coupled to the output of the first D flip-flop circuit 425 through the OR gate 430 and the AND gate 428, and coupled to the output of the second D flip-flop circuit 426 through the OR gate 430, the delay circuit 429, and the AND gate 427. The propagation delay circuit 431 generates the PWM signal $V_{PWM}$ in response to the output of the first D flip-flop circuit 425 or second D flip-flop circuit 426.

Reference is again made to FIG. 4 as well as FIG. 3. The over-power protection circuit 417 of the switching control circuit 30 includes a second current mirror, a current source $I_{REF1}$, a limiting resistor $R_{LMT}$ and a limit comparator 412, wherein the second current mirror is composed of transistors 404, 405. Moreover, the second current mirror is coupled to the transistor 403 of the first current mirror by the transistor 404 for receiving the second current $I_2$ and transforming the second current $I_2$ into a third current $I_3$ flowing through the transistor 405. The current source $I_{REF1}$ is coupled to the transistor 405 of the second current mirror for providing a fourth current $I_4$ to the limiting resistor $R_{LMT}$. Wherein the fourth current $I_4$ can be expressed as the follow equation:

$$I_4 = I_{REF1} - I_3$$

The limiting resistor $R_{LMT}$ receives the fourth current $I_4$ for providing an over-power limiting voltage $V_{LMT}$. The limit comparator 412 is coupled to the limiting resistor $R_{LMT}$ and the current sensing resistor $R_S$ of the switching power converter so as to receive the over-power limit voltage $V_{LMT}$ and a switching current signal $V_{CS}$, and detect whether the switching power converter is operating in over-power in response to the over-power limit voltage $V_{LMT}$ and a switching current signal $V_{CS}$. Moreover, the limit comparator 412 outputs an over-power signal $S_O$ to turn off the switching device $Q_1$ while the switching current signal $V_{CS}$ is larger than the over-power limit voltage $V_{LMT}$ (over-power status), for achieving the object of over-power protection.

Figure 8:
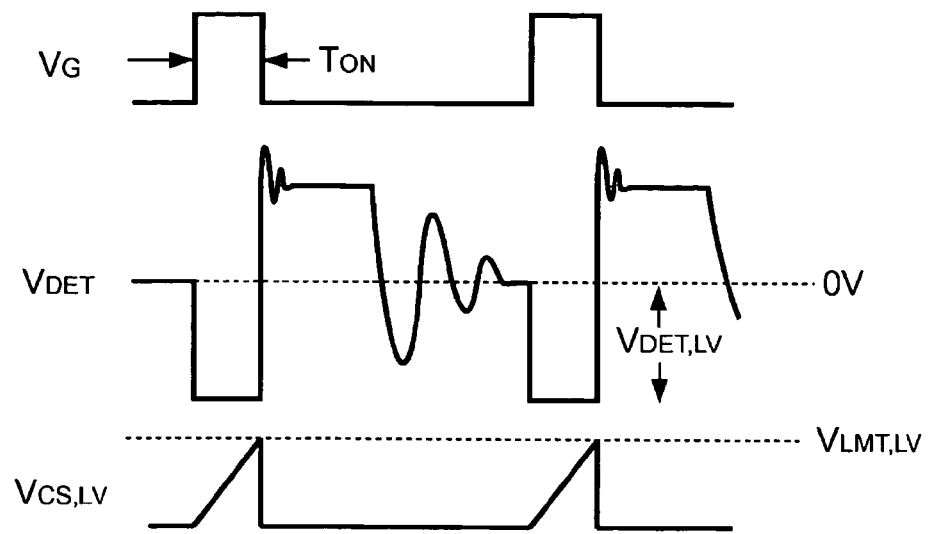
FIG. 8 is a wave schematic diagram of control signals of the over-power protection under low line voltage of the present invention.

Reference is again made to FIG. 4 as well as FIG. 8. When the switching power converter operates in low line voltage and the switching device $Q_1$ is turned on, the current sensing resistor $R_S$ (shown in FIG. 3) generates a saw switching current signal $V_{CS,LV}$. At this time, the voltage receiver 411 receives a lower reflected voltage signal $V_{DET,LV}$ from the resistor $R_2$ (shown in FIG. 3), then a higher over-power limit voltage $V_{LMT,LV}$ is generated according to the lower reflected voltage signal $V_{DET,LV}$. Therefore, the over-power protection unit 417 provides higher over-power limit voltage $V_{LMT,LV}$ for being a threshold limit voltage and compares it with the saw switching limiting resistor $R_{LMT}$ current signal $V_{CS,LV}$ so as to achieve the objects of power stability and over-power protection.

Figure 9:
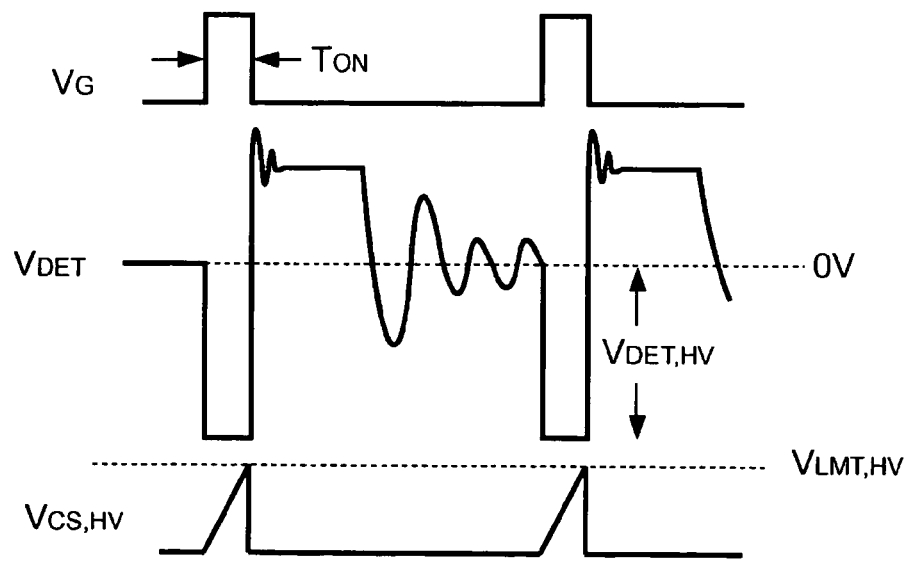
FIG. 9 is a wave schematic diagram of control signals of the over-power protection under high line voltage of the present invention.

Reference is again made to FIG. 4 as well as FIG. 9. When the switching power converter operates in high line voltage and the switching device $Q_1$ is turned on, the current sensing resistor $R_S$ generates a sharp saw switching current signal $V_{CS,HV}$. At this time, the voltage receiver 411 receives a higher reflected voltage signal $V_{DET,HV}$ from the resistor $R_2$ (shown in FIG. 3), then the limiting resistor $R_{LMT}$ generates a lower over-power limit voltage $V_{LMT,HV}$ according to the higher reflected voltage signal $V_{DET,HV}$. Therefore, the over-power protection unit 417 provides lower over-power limit voltage $V_{LMT,HV}$ for being a threshold limit voltage and compares it with the sharp switching current signal $V_{CS,HV}$ so as to achieve the objects of power stability and over-power protection.

Figure 5:
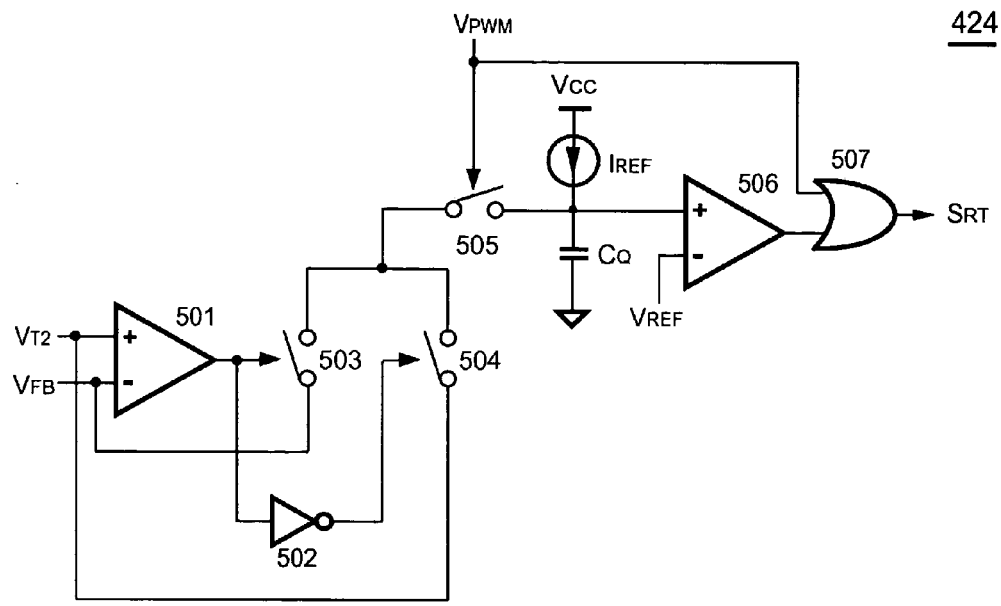
FIG. 5 is a circuit schematic diagram of a minimum off-time circuit of the present invention.

Referring to FIG. 5, which is a circuit diagram of a minimum off-time circuit 424 according to an embodiment of the invention. The minimum off-time circuit 424 comprises a first comparator 501, an inverter 502, three switches 503, 504 and 505, a current source $I_{REF}$, a capacitor $C_Q$, a second comparator 506 and an OR gate 507. The switch 503 is coupled to the feedback voltage $V_{FB}$ and controlled by an output of the first comparator 501, and the switch 504 is coupled to the threshold voltage $V_{T2}$ and controlled by an output of the first comparator 501 through an inverter 502.

The switch 505 is coupled to receive the feedback voltage signal $V_{FB}$ through switch 503 or coupled to receive the threshold voltage signal $V_{T2}$ through the switch 504, and controlled by the PWM signal $V_{PWM}$. The capacitor $C_Q$ is coupled to the current source $I_{REF}$ and the switch 505. The current source $I_{REF}$ and the capacitor $C_Q$ develop a charge circuit to coupled to the second comparator 506. The second comparator 506 generates the output signal $S_{RT}$ through the OR gate 507. Another input of the OR gate 507 is coupled to receive the PWM signal $V_{PWM}$.

Figure 6:
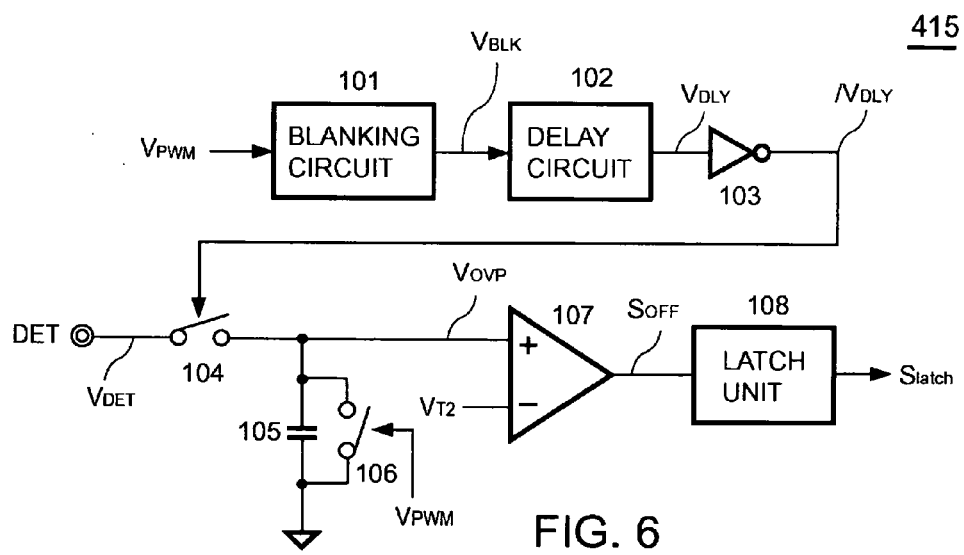
FIG. 6 is a circuit schematic diagram of an over-voltage protection unit of the present invention.
Figure 10:
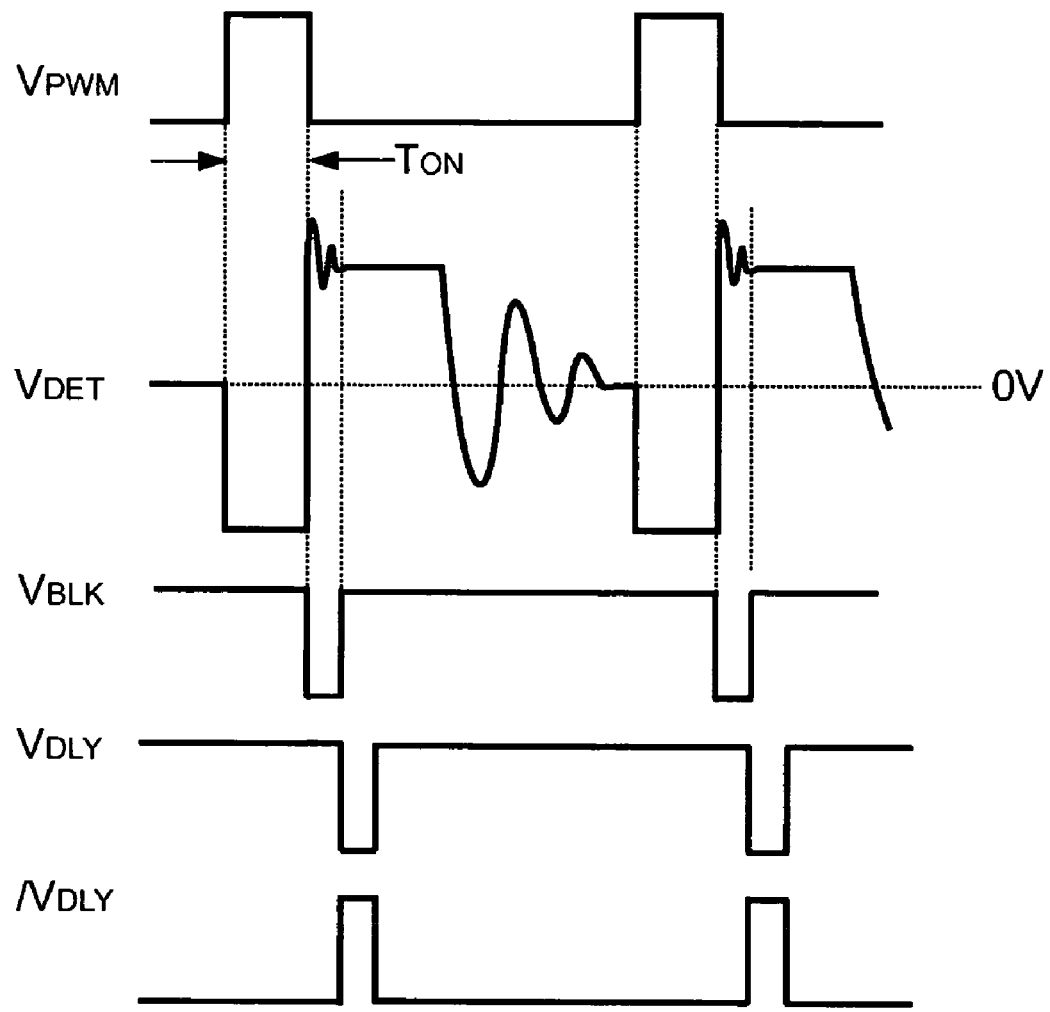
FIG. 10 is a wave schematic diagram of control signals of the over-voltage protection of the present invention.

Referring to FIG. 6 and FIG. 10, which is a circuit diagram of an over-voltage protection circuit 415 according to an embodiment of the invention. The over-voltage protection circuit (OVP) 415 comprises a blanking circuit 101, a delay circuit 102 and an inverter 103, wherein the blanking circuit 101 is coupled to the propagation delay circuit 431 so as to receive the PWM signal $V_{PWM}$, and output a blanking signal $V_{BLK}$. The delay circuit 102 is coupled to the blanking circuit 101 so as to receive the blanking signal $V_{BLK}$, and output a delay signal $V_{DLY}$ after a blank time. During the blank time, the surge voltage of the reflected voltage signal $V_{DET}$ will be blanked out. The inverter 103 is coupled to the delay circuit 102 so as to receive the delay signal $V_{DLY}$, and output the sampling signal $/V_{DLY}$ so as to turn on the sampling switch 104 for sampling the reflected voltage signal $V_{DET}$.

The over-voltage protection circuit 415 further comprises a switch 104, a capacitor 105, a discharging switch 106, a comparator 107, and a latch unit 108. When the sampling signal $/V_{DLY}$ is enabled, the reflected voltage signal $V_{DET}$ is flowed into the capacitor 105, and a charging signal Vovp is provided to an input of the comparator 107, another input of the comparator 107 is coupled to an threshold voltage $V_{T2}$, When the voltage of the sampling signal $/V_{DLY}$ is larger than the threshold voltage $VT_2$, The output signal $S_{OFF}$ of the comparator 107 is enabled, and a latch signal $S_{latch}$ is enabled for disabling the output signal $V_G$ (over-voltage status). Moreover, the discharging switch 106 is coupled to the capacitor 105 so as to discharge the capacitor 105 in response to the PWM signal $V_{PWM}$.

Figure 7A:
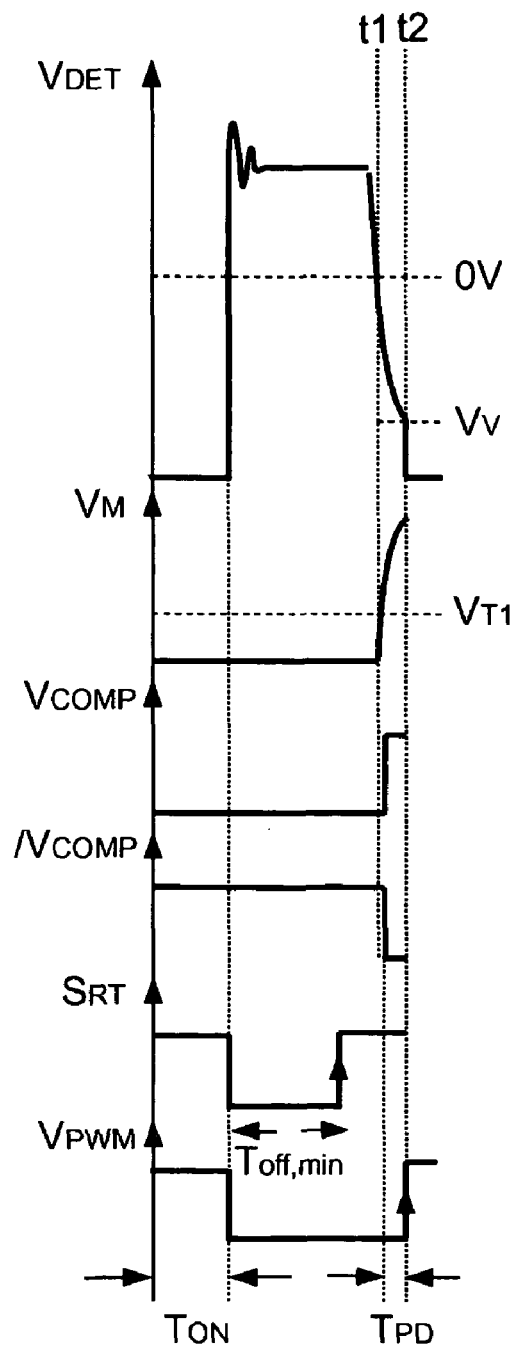
FIG. 7A is a wave schematic diagram of control signals of the switching control circuit under full-load of the present invention.

Reference is again made to FIG. 4 as well as FIG. 7A. After the switching device $Q_1$ is turned off, the reflected voltage signal $V_{DET}$ has alternate positive voltage and negative voltage. During the time t1-t2, the reflected voltage signal $V_{DET}$ is at first voltage $V_{V1}$. At this time, the peak voltage signal $V_M$ is built up, and the magnitude of the peak voltage signal $V_M$ is inverse proportional to the first voltage $V_{V1}$. At this time, the magnitude of the peak voltage signal $V_M$ is greater than the first threshold voltage $V_{T1}$ and the control signal $V_{COMP}$ is enabled. The minimum off-time circuit 424 outputs the output signal $S_{RT}$ with shortest off-time Toff,min to the propagation delay circuit 431, while the switching power converter is operating in full load.

The propagation delay circuit 431 outputs the PWM signal $V_{PWM}$ in response to the control signal $V_{COMP}$ and the shortest off-time Toff,min of the output signal $S_{RT}$ so as to turn on the switching device $Q_1$ after a delay time $T_{PD}$. At this time, the first voltage $V_{V1}$ of the reflected voltage signal $V_{DET}$ is close to the valley voltage, and then, the voltage $V_D$ across the switching device $Q_1$ is also close to the valley voltage. Therefore, the switching control circuit 30 can provide soft switching and high efficiency for the switching power converter, while the switching power converter is operating in full load.

Figure 7B:
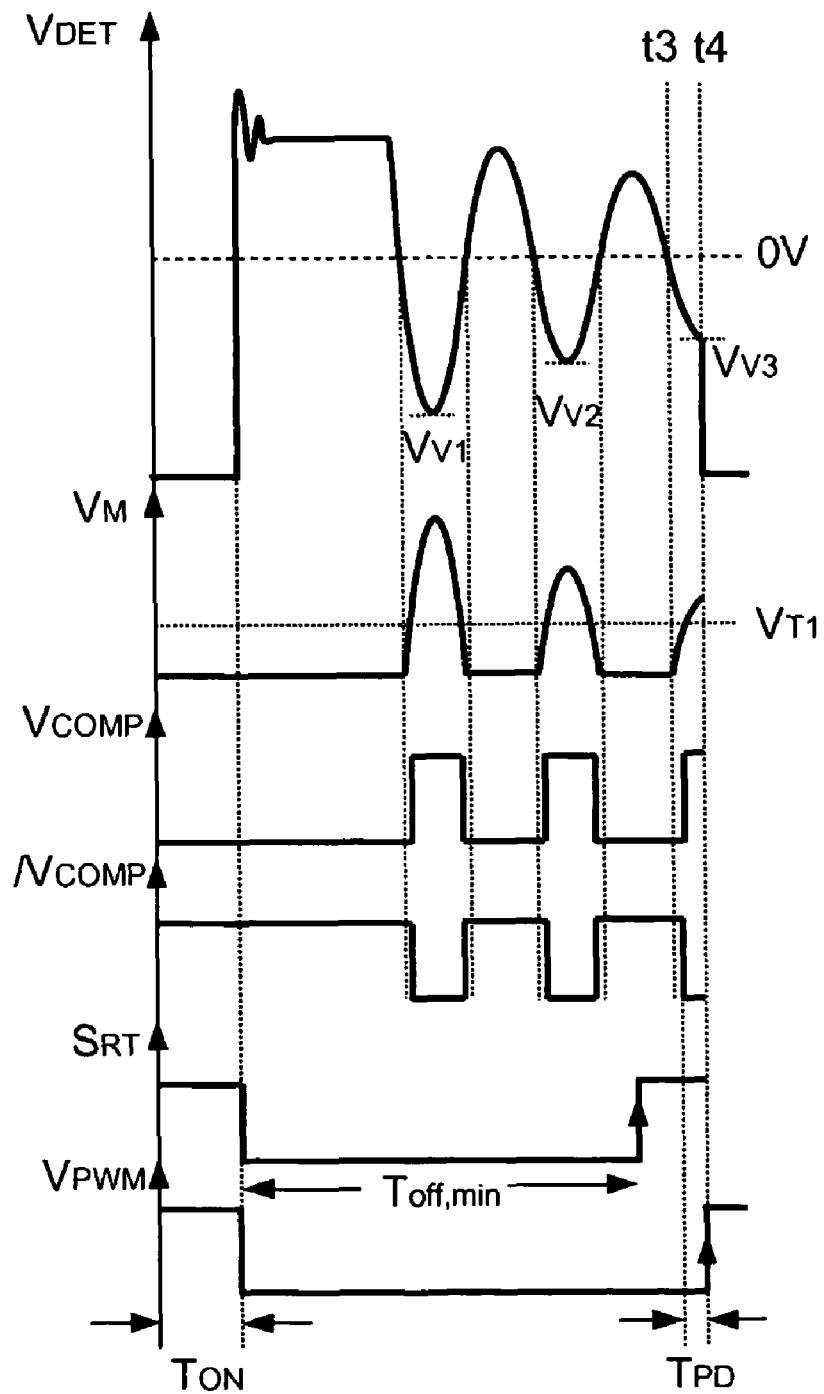
FIG. 7B is a wave schematic diagram of control signals of the switching control circuit under half-load of the present invention.

Reference is again made to FIG. 4 as well as FIG. 7B. After the switching device $Q_1$ is turned off, the reflected voltage signal $V_{DET}$ has alternate positive voltage and negative voltage, wherein the negative voltages includes a first valley voltage $V_{V1}$, a second valley voltage $V_{V2}$ and a third valley voltage $V_{V3}$. While at the first valley voltage $V_{V1}$ and the second valley voltage $V_{V2}$, the PWM signal $V_{PWM}$ is disable in response to the disable of the output signal $S_{RT}$. During the time $t_3$-$t_4$, the reflected voltage signal $V_{DET}$ is at third valley voltage $V_{V3}$, Once the magnitude of the peak voltage signal $V_M$ is greater than the first threshold voltage $V_{T1}$, the control signal $V_{COMP}$ is turned to logic high. At the mean time, since the output signal $S_{RT}$ is logic high, the PWM signal $V_{PWM}$ is turned to logic high in response to the reflected voltage signal $V_{DET}$ and the output signal $S_{RT}$.

Figure 7C:
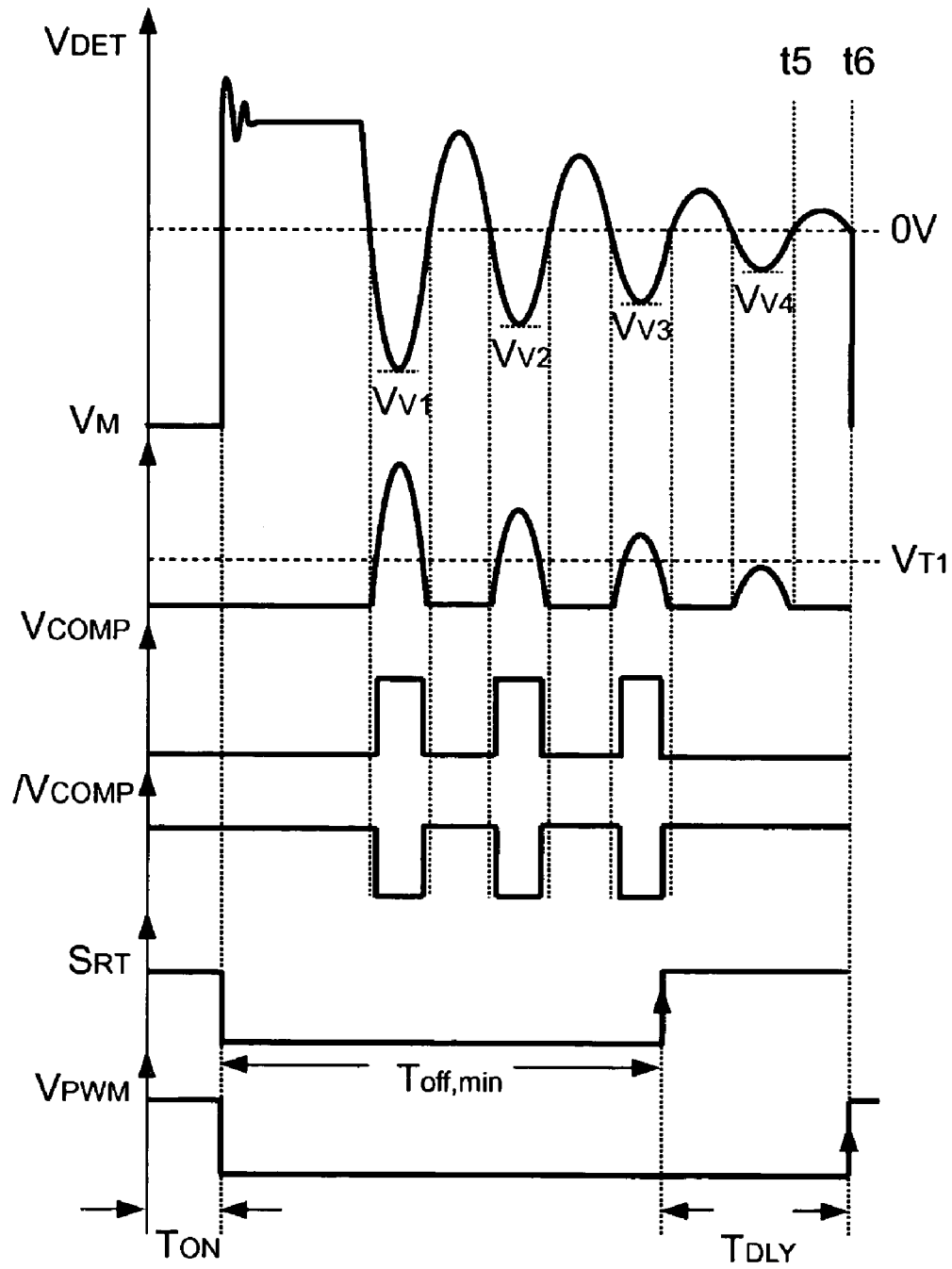
FIG. 7C is a wave schematic diagram of control signals of the switching control circuit under light-load of the present invention.

Reference is made to FIG. 4 as well as FIG. 7C. After the switching device Q1 is turned off, the reflected voltage signal $V_{DET}$ has alternate positive voltage and negative voltage, wherein the negative voltages includes a first valley voltage $V_{V1}$, a second valley voltage $V_{V2}$, a third valley voltage $V_{V3}$ and a fourth valley voltage $V_{V4}$. During the time t5-t6, the reflected voltage signal $V_{DET}$ is at fourth valley voltage $V_{V4}$, at this time, the peak voltage signal $V_M$ is smaller than the first threshold voltage $V_{T1}$, so the control signal $V_{COMP}$ keeps in low-level. Moreover, the minimum off-time circuit 424 outputs the output signal $S_{RT}$ with longer off-time Toff,min to the delay circuit 429, while the switching power converter is operating in light load.

The delay circuit 429 outputs a delay signal $S_T$ to the propagation delay circuit 431 according to the low-level control signal $V_{COMP}$ and the longer off-time Toff,min of the high-level output signal $S_{RT}$. The propagation delay circuit 431 outputs the PWM signal $V_{PWM}$ according to the delay signal so as to turn on the switching device $Q_1$ after a delay time $T_{DLY}$, wherein the delay time $T_{DLY}$ is longer than the delay time $T_{PD}$. Furthermore, the switching control circuit 30 forces the switching device $Q_1$ to be turned on during the delay time $T_{DLY}$ so as to avoid the switching power converter shutting down due to the long off-time of the switching device $Q_1$. Therefore, the switching control circuit 30 can provide soft switching and high efficiency for the switching power converter, while the switching power converter is operating in light load.

In summary, the switching control circuit of the present invention can detect whether the voltage $V_D$ across the switching device is close to the valley voltage in accordance with the reflected voltage signal, while the switching device is turned off. Moreover, the switching control circuit of the present invention further can adjust the off-time of the switching device according to the magnitude of the load of the switching power converter so as to achieve the effect of energy saving. Therefore, the switching control circuit of the present invention can provide soft switching and high efficiency for the switching power converter when operating in various loading conditions.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A switching control circuit for a switching power converter, the switching control circuit being coupled to a switching device and an auxiliary winding of a transformer, and a primary winding of the transformer being coupled to the switching device, wherein the switching control circuit comprises:
   a voltage receiver, comprising:
      a switch coupled to the auxiliary winding of the transformer through a resistor for receiving a reflected voltage signal from the resistor, the reflected voltage being proportional to a voltage across the switching device when the switching device is turned off;
      a first current mirror coupled to the switch for transforming a first current flowing through the switch into a second current; and
      a sampling resistor coupled to the first current mirror for receiving the second current and generating a peak voltage signal;
   a comparing unit coupled to the voltage receiver for receiving the peak voltage signal and a first threshold voltage for outputting a comparison result; and
   a propagation delay circuit coupled to the comparing unit for receiving the comparison result and outputting an (pulse width modulation) PWM signal to turn on the switching device after a delay time.

2. The switching control circuit for a switching power converter of claim 1, further comprising an over-power protection circuit coupled to the voltage receiver and the switching device, wherein the over-power protection circuit receives an over-power limit voltage which is inversely proportional to the peak voltage signal, and turns off the switching device while the switching power converter is in over-power status.

3. The switching control circuit for a switching power converter of claim 2, wherein the over-power protection circuit comprises:
   a second current mirror coupled to the first current mirror for transforming the second current into a third current;
   a current source coupled to the second current mirror for providing a fourth current; and
   a limiting resistor coupled between a transistor of the second current mirror and the current source to receive the fourth current, for generating an over-power limit voltage.

4. The switching control circuit for a switching power converter of claim 1, further comprising an over-voltage protection unit coupled to the auxiliary winding of the transformer, the propagation delay circuit and the switching device, wherein the over-voltage protection unit receives the reflected voltage signal from the auxiliary winding in response to the PWM signal, and latches the switching device while the switching power converter is in over-voltage status.

5. The switching control circuit for a switching power converter of claim 4, wherein the over-voltage protection circuit comprises:
   a blanking circuit coupled to the propagation delay circuit for receiving the PWM signal, and outputting a blanking signal;
   a delay circuit coupled to the blanking circuit for receiving the blanking signal, and outputting a delay signal after a blank time;
   an inverter coupled to the delay circuit for receiving the delay signal, and outputting a sampling signal;
   a capacitor;
   a switch coupled to the auxiliary winding of the transformer and the capacitor for sampling the reflected voltage signal from the auxiliary winding in response to the sampling signal, and flowing the reflected voltage signal into the capacitor;
   a comparator coupled to the capacitor for comparing a charging signal and a threshold voltage, and outputting an enabled signal; and
   a latch unit coupled to the comparator and the switching device for receiving the enabled signal, and outputting a latch signal to turn off the switching device.

6. The switching control circuit for a switching power converter of claim 5, further comprising a discharging switch coupled to the capacitor for discharging the capacitor in response to the PWM signal.

7. A switching control circuit for a switching power converter, the switching control circuit being coupled to a switching device and an auxiliary winding of a transformer, and a primary winding of the transformer being coupled to the switching device, wherein the switching control circuit comprises:
   a voltage receiver, comprising:
      a switch coupled to the auxiliary winding of the transformer through a resistor for receiving a reflected voltage signal from the resistor, the reflected voltage being proportional to a voltage across the switching device when the switching device is turned off;
      a first current mirror coupled to the switch for transforming a first current flowing through the switch into a second current; and
      a sampling resistor coupled to the first current mirror for receiving the second current and generating a peak voltage signal;
   a comparing unit coupled to the voltage receiver for receiving the peak voltage signal and a first threshold voltage for outputting a comparison result;
   a minimum off-time circuit coupled to an output terminal of the switching power converter for generating an output signal in response to a magnitude of a load of the switching power converter; and
   a propagation delay circuit coupled to the comparing unit and the minimum off-time circuit for receiving the comparison result and the output signal and outputting a (pulse width modulation) PWM signal to turn on the switching device after a delay time.

8. The switching control circuit for a switching power converter of claim 7, further comprising a over-power protection circuit coupled to the voltage receiver and the switching device, wherein the over-power protection circuit receives an over-power limit voltage which is inversely proportional to the peak voltage signal, and turns off the switching device while the switching power converter is in over-power status.

9. The switching control circuit for a switching power converter of claim 8, wherein the over-power protection circuit comprises:
   a second current mirror coupled to the first current mirror for transforming the second current into a third current;
   a current source coupled to the second current mirror for providing a fourth current;
   a limiting resistor coupled between a transistor of the second current mirror and the current source to receive the fourth current, for generating the over-power limit voltage.

10. The switching control circuit for a switching power converter of claim 7, further comprising an over-voltage protection unit coupled to the auxiliary winding of the transformer, the propagation delay circuit and the switching device, wherein the over-voltage protection unit receives the reflected voltage signal from the auxiliary winding in response to the PWM signal, and latches the switching device while the switching power converter is in over-voltage status.

11. The switching control circuit for a switching power converter of claim 10, wherein the over-voltage protection unit comprises:
   a blanking circuit coupled to the propagation delay circuit for receiving the PWM signal, and outputting a blanking signal;
   a delay circuit coupled to the blanking circuit for receiving the blanking signal, and outputting a delay signal after a blank time;
   an inverter coupled to the delay circuit for receiving the delay signal, and outputting a sampling signal;
   a capacitor;
   a switch coupled to the auxiliary winding of the transformer and the capacitor for sampling the reflected voltage signal from the auxiliary winding in response to the sampling signal, and flowing the reflected voltage signal into the capacitor;
   a comparator coupled to the capacitor for comparing a charging signal and a threshold voltage, and outputting an enabled signal; and
   a latch unit coupled to the comparator and the switching device for receiving the enabled signal, and outputting a latch signal to turn off the switching device.

12. The switching control circuit for a switching power converter of claim 11, further comprising a discharging switch coupled to the capacitor for discharging the capacitor in response to the PWM signal.

13. A switching control circuit for a switching power converter, the switching control circuit being coupled to a switching device and an auxiliary winding of a transformer, and a primary winding of the transformer being coupled to the switching device, wherein the switching control circuit comprises:
   a voltage receiver , comprising:
      a switch coupled to the auxiliary winding of the transformer through a resistor for receiving a reflected voltage signal from the resistor, the reflected voltage being proportional to a voltage across the switching device when the switching device is turned off;
      a first current mirror coupled to the switch for transforming a first current flowing through the switch into a second current; and a sampling resistor coupled to the first current mirror for receiving the second current and generating a peak voltage signal;

a comparing unit coupled to the voltage receiver for receiving the peak voltage signal and a first threshold voltage for outputting a comparison result;

a minimum off-time circuit coupled to an output terminal of the switching power converter for generating an output signal in response to a magnitude of a load of the switching power converter;

a first delay circuit coupled to the comparing unit and the minimum off-time circuit for outputting a first delay signal in response to the comparison result and the output signal; and a propagation delay circuit coupled to the delay circuit for receiving the delay signal, and outputting a (pulse width modulation) PWM signal to turn on the switching device after a delay time.

14. The switching control circuit for a switching power converter of claim 13, further comprising a over-power protection circuit coupled to the voltage receiver and the switching device, wherein the over-power protection circuit receives an over-power limit voltage which is inversely proportional to the peak voltage signal, and turns off the switching device while the switching power converter is in over-power status.

15. The switching control circuit for a switching power converter of claim 14, wherein the over-power protection circuit comprises:

a second current mirror coupled to the first current mirror for transforming the second current into a third current;

a current source coupled to the second current mirror for providing a fourth current;

a limiting resistor coupled between a transistor of the second current mirror and the current source to receive the fourth current, for generating the over-power limit voltage.

16. The switching control circuit for a switching power converter of claim 13, further comprising an over-voltage protection unit coupled to the auxiliary winding of the transformer, the propagation delay circuit and the switching device, wherein the over-voltage protection unit receives the reflected voltage signal from the auxiliary winding in response to the PWM signal, and latches the switching device while the switching power converter is in over-voltage status.

17. The switching control circuit for a switching power converter of claim 16, wherein the over-voltage protection unit comprises:

a blanking circuit coupled to the propagation delay circuit for receiving the PWM signal, and outputting a blanking signal;

a second delay circuit coupled to the blanking circuit for receiving the blanking signal, and outputting a second delay signal after a blank time;

an inverter coupled to the delay circuit for receiving the delay signal, and outputting a sampling signal;

a capacitor;

a switch coupled to the auxiliary winding of the transformer and the capacitor for sampling the reflected voltage signal from the auxiliary winding in response to the sampling signal, and flowing the reflected voltage signal into the capacitor;

a comparator coupled to the capacitor for comparing a charging signal and a threshold voltage, and outputting an enabled signal; and a latch unit coupled to the comparator and the switching device for receiving the enabled signal, and outputting a latch signal to turn off the switching device.

18. The switching control circuit for a switching power converter of claim 17, further comprising a discharging switch coupled to the capacitor for discharging the capacitor in response to the PWM signal.

* * * * *